United States Patent
Xin et al.

(10) Patent No.: US 12,381,768 B2
(45) Date of Patent: Aug. 5, 2025

(54) DATA TRANSMISSION METHOD AND APPARATUS, DATA MODULATION METHOD AND APPARATUS, ELECTRONIC DEVICE, AND STORAGE MEDIUM

(71) Applicant: ZTE CORPORATION, Guangdong (CN)

(72) Inventors: Yu Xin, Shenzhen (CN); Tong Bao, Shenzhen (CN); Guanghui Yu, Shenzhen (CN); Jin Xu, Shenzhen (CN); Liujun Hu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 18/556,937

(22) PCT Filed: Jul. 12, 2022

(86) PCT No.: PCT/CN2022/105273
§ 371 (c)(1),
(2) Date: Oct. 24, 2023

(87) PCT Pub. No.: WO2023/284752
PCT Pub. Date: Jan. 19, 2023

(65) Prior Publication Data
US 2024/0223427 A1 Jul. 4, 2024

(30) Foreign Application Priority Data
Jul. 12, 2021 (CN) .......................... 202110785577.8

(51) Int. Cl.
*H04L 27/26* (2006.01)

(52) U.S. Cl.
CPC .... *H04L 27/2628* (2013.01); *H04L 27/26025* (2021.01); *H04L 27/2634* (2013.01)

(58) Field of Classification Search
CPC ..... H04L 27/00; H04L 27/26; H04L 27/2601; H04L 27/2628; H04L 27/2634;
(Continued)

(56) References Cited

U.S. PATENT DOCUMENTS

2014/0341048 A1* 11/2014 Sajadieh ............... H04L 5/0053
370/252
2017/0156140 A1* 6/2017 Islam .................... H04L 5/0044
(Continued)

FOREIGN PATENT DOCUMENTS

WO WO 2020/034493 A1 2/2020

OTHER PUBLICATIONS

"Considerations on bandwidth and subcarrier spacing for above 52.6 GHz" 3GPP TSG RAN WG1 #101, E-Meeting, May 25-Jun. 5, 2020, 3 pages.
(Continued)

*Primary Examiner* — Khanh C Tran
(74) *Attorney, Agent, or Firm* — Dority & Manning, P.A.

(57) ABSTRACT

A data transmission method is provided, the method includes: transmitting to-be-transmitted data in N frequency domain resource blocks, wherein the N frequency domain resource blocks include at least one subcarrier respectively, and N is an integer greater than or equal to 1; performing a first processing on to-be-transmitted data on each frequency domain resource block of the N frequency domain resource blocks, to form N data sequences; performing a second processing on the N data sequences to form a data sequence; and transmitting the data sequence.

19 Claims, 6 Drawing Sheets

(58) Field of Classification Search
CPC ............. H04L 27/263; H04L 27/26025; H04L 27/2636; H04L 27/2637; H04L 27/2602; H04L 27/2626; H04L 27/2627
See application file for complete search history.

(56) References Cited

U.S. PATENT DOCUMENTS

| | | |
|---|---|---|
| 2018/0048510 A1 | 2/2018 | Nadal et al. |
| 2018/0332602 A1* | 11/2018 | Lee .................... H04W 72/569 |
| 2019/0028317 A1 | 1/2019 | Xin et al. |
| 2019/0280818 A1 | 9/2019 | Renfors et al. |
| 2021/0105112 A1 | 4/2021 | Cho |

OTHER PUBLICATIONS

"Discussion on filtered waveform for NR", 3GPP TSG RAN WG1 #85, Nanjing, China, May 23-27, 2016, 6 pages.
"Preliminary evaluation of OFDM based waveforms for NR to support NTN" 3GPP TSG RAN WG1 #99, Reno, Nevada, Nov. 11-18, 2019.
International Search Report (with English translation) received in corresponding Application No. PCT/CN2022/105273, dated Oct. 10, 2022, 12 pages.
Extended European Search Report for corresponding Application No. 22841386.0, dated May 23, 2025, 8 pages.
3GPP TSG-RAN WG1 Meeting #86b, "flexi-OFDMA, a new waveform for NR", CEWiT, IITH, IITM, Tejas Networks, Reliance-jio, Lisbon, Portugal, October $10^{th}$-$14^{th}$, 2016, 6 pages.

* cited by examiner

DATA TRANSMISSION METHOD AND APPARATUS, DATA MODULATION METHOD AND APPARATUS, ELECTRONIC DEVICE, AND STORAGE MEDIUM

CROSS-REFERENCE TO RELATED APPLICATION(S)

This application is a national phase entry under 35 USC 371 of International Patent Application No. PCT/CN2022/105273 filed on Jul. 12, 2022, the International Patent Application is filed based on Chinese Patent Application with the application No. 202110785577.8, filed on Jul. 12, 2021, and claims priority to the Chinese Patent Application, the entire contents of the International Patent Application and the Chinese Patent Application are incorporated herein by reference.

TECHNICAL FIELD

The present disclosure relates to the technical field of wireless communication technology, and for example, to a data transmission method and apparatus, a data modulation method and apparatus, an electronic device and a storage medium.

BACKGROUND

Long Term Evolution (LTE) technology is a Fourth Generation (4G) wireless cellular communication technology. LTE adopts an Orthogonal Frequency Division Multiplexing (OFDM) technology, where a subcarrier and an OFDM symbol constitute a wireless physical time-frequency resource of the LTE system. At present, OFDM technology is widely used in wireless communication, and a CP-OFDM system adopting cyclic prefix (CP) solves a multi-path delay problem that occurs in the communication better, and a frequency selective channel is divided into a set of parallel flat channels, thereby greatly simplifying a channel estimation method and ensuring a higher channel estimation precision. However, the performance of the CP-OFDM system is sensitive to a frequency offset and a time offset between adjacent subbands, and due to a problem of large frequency spectrum leakage of the system, inter-subband interference is easily caused. At present, the LTE system adopts a guard interval in the frequency domain to reduce inter-subband interference.

At present, the Fifth Generation New Radio (5GNR) communication technology still adopts CP-OFDM as a basic waveform, and different numerologies can be adopted between two adjacent subbands, which will destroy orthogonality between subcarriers, resulting in a new interference problem. For these new interference problems, a more common method is to insert a guard bandwidth between two transmission bands having different numerologies, but this method will waste a frequency resource. However, in the future sixth-generation services, the used frequency band span is large, the deployment methods are diverse, the requirements for channel bandwidth are higher, and there are more types of waveform schemes. Thus, it is necessary to flexibly support multiple groups of waveform schemes currently.

SUMMARY

Embodiments of the present disclosure provide a data transmission method and apparatus, a data modulation method and apparatus, an electronic device, and a storage medium, so as to implement the support of multiple groups of waveform schemes, thus reducing the waste of frequency resources, reducing out-of-band frequency leakage, and improving communication efficiency of devices.

The embodiments of the application provide a data transmission method, where the method includes the following steps:

transmitting to-be-transmitted data in N frequency domain resource blocks, where the N frequency domain resource blocks include at least one subcarrier respectively, and N is an integer greater than or equal to 1;

performing a first processing on to-be-transmitted data on each frequency domain resource block of the N frequency domain resource blocks, to form N data sequences;

performing a second processing on the N data sequences, to form a data sequence; and transmitting the data sequence.

The embodiments of the present disclosure further provide a data modulation method, where the method includes the following steps:

dividing to-be-transmitted data into N data sets, where each data set of the N data sets at least includes a piece of data, and N is an integer greater than or equal to 1;

performing an inverse Fourier transform on each data set, to form N data sequences;

performing an inverse Fourier transform on the N data sequences, to form a data sequence; and transmitting the data sequence on a time-frequency resource.

The embodiments of the present disclosure further provide a signal transmission apparatus, where the apparatus includes:

a resource block loading module, configured to transmit to-be-transmitted data in N frequency domain resource blocks, where the N frequency domain resource blocks include at least one subcarrier respectively, and N is an integer greater than or equal to 1;

a resource block processing module, configured to perform a first processing on to-be-transmitted data on each frequency domain resource block of the N frequency domain resource blocks, to form N data sequences;

a sequence processing module, configured to perform a second processing on the N data sequences to form a data sequence; and a sequence transmitting module, configured to transmit the data sequence.

The embodiments of the present disclosure further provide a data modulation apparatus, where the apparatus includes:

a data grouping module, configured to divide to-be-transmitted data into N data sets, where each data set of the N data sets at least includes a piece of data, and N is an integer greater than or equal to 1;

a grouping processing module, configured to perform an inverse Fourier transform on each data set, to form N data sequences;

a sequence merging module, configured to perform an inverse Fourier transform on the N data sequences, to form a data sequence; and a sequence transmitting module, configured to transmit the data sequence on a time-frequency resource.

The embodiments of the present disclosure further provide an electronic device, where the electronic device includes:

one or more processors; and a memory, configured to store one or more programs;

where the one or more programs, upon being executed by the one or more processors, cause the one or more processors to implement the method described in any one of the embodiments of the present disclosure.

The embodiments of the present disclosure further provide a computer-readable storage medium having stored a computer program thereon, where the computer program, upon being executed by a processor, implements the method described in any one of the embodiments of the present disclosure.

DETAILED DESCRIPTION

It should be understood that the specific embodiments described herein are only used to explain the present disclosure, and not to limit the present disclosure.

In the following description, suffixes such as "modules", "components" or "units" for representing elements are only used for facilitating the description of the present disclosure, and have no specific meaning in themselves. Thus, "modules", "components" or "units" may be used in a mixed manner.

Figure 1:
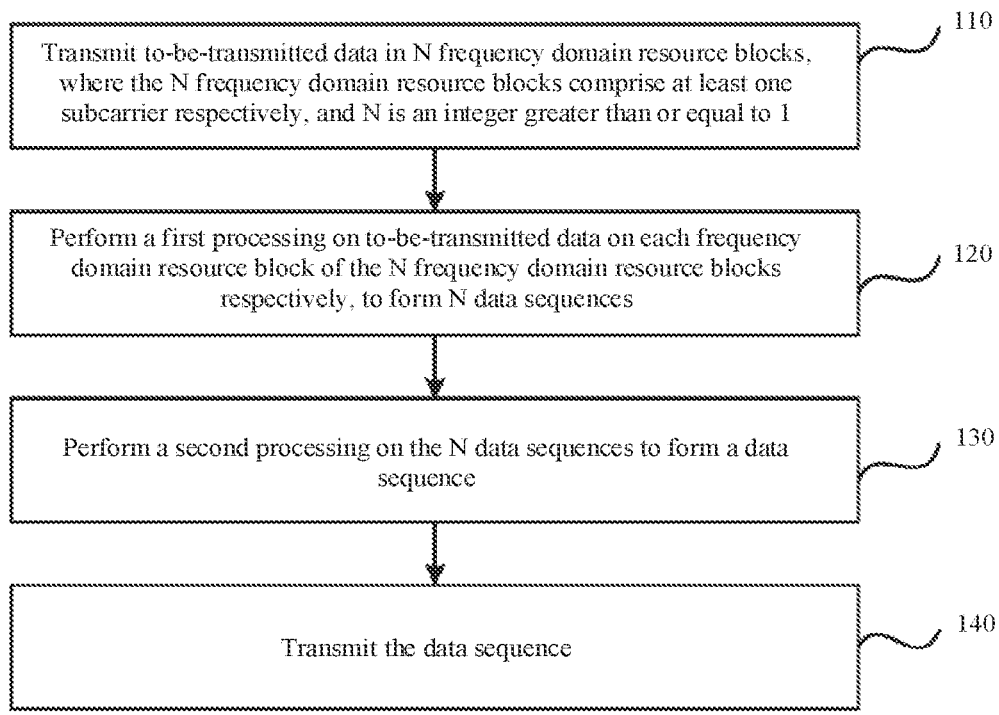
FIG. 1 is a flow chart of a data transmission method provided by an embodiment of the present disclosure.

FIG. 1 is a flow chart of a data transmission method provided by an embodiment of the present disclosure. The embodiments of the present disclosure may be applied to a case of supporting the multi-waveform scheme in communication, the method may be performed by a data transmission apparatus, where the apparatus may be implemented by software and/or hardware, and is generally integrated into a base station or a communication terminal. Referring to FIG. 1, the method provided by an embodiment of the present disclosure includes the following steps.

Step 110: transmitting to-be-transmitted data in N frequency domain resource blocks, where the N frequency domain resource blocks include at least one subcarrier respectively, and N is an integer greater than or equal to 1.

Herein, the frequency domain resource block may be an allocation unit of a physical layer data transmission resource, the frequency domain resource block may be composed of multiple consecutive subcarriers, and the to-be-transmitted data may be physical layer data that needs to be transmitted.

In an embodiment of the present disclosure, the to-be-transmitted data may be divided into multiple groups, and each group of data may be transmitted on a frequency domain resource block. It can be understood that, a number of subcarriers included in each frequency domain resource block may be the same or different.

Step 120: performing a first processing on to-be-transmitted data on each frequency domain resource block, to form N data sequences.

Herein, the data sequence may be the processed to-be-transmitted data, and each data sequence may be generated by the to-be-transmitted data on a frequency domain resource block.

For example, the first processing may be performed on the transmitted to-be-transmitted data on each frequency domain resource block, to convert the to-be-transmitted data to a data sequence. It can be understood that, the way of the first processing may include but is not limited to a Fourier transform, an inverse Fourier transform, a cyclic prefix adding, and a reference signal adding, etc. Step 120 may also be understood as a subcarrier level processing.

Step 130: performing a second processing on the N data sequences to form a data sequence.

In an embodiment of the present disclosure, the second processing may be performed on multiple data sequences, and N data sequences are merged into a data sequence. It can be understood that, in the process of the second processing, operations such as a Fourier transform or an inverse Fourier transform, etc., may also be performed on data sequences on the frequency domain resource blocks respectively. Step 130 may also be understood as a subband level processing, and it can be understood that, N frequency domain resource blocks may be understood as N subbands.

Step 140: transmitting the data sequence.

For example, the generated data sequence may be transmitted.

In an embodiment of the present disclosure, the to-be-transmitted data is transmitted in multiple frequency domain resource blocks, each frequency domain resource block includes at least one subcarrier, a first processing is performed on the to-be-transmitted data in each frequency domain resource block to form multiple data sequences, a second processing is performed on multiple data sequences simultaneously to form a data sequence, and the generated data sequence is transmitted, thus the support of multiple waveform schemes is implemented, the waste of the transmission resource is reduced, out-of-band leakage can be reduced, and further, the communication efficiency of devices is improved.

For example, based on the above embodiments of the present disclosure, numbers of subcarriers included in the N frequency domain resource blocks respectively are the same.

Herein, a number of subcarriers may represent a number of subcarriers included on the frequency domain resource block.

In an embodiment of the present disclosure, a number of subcarriers included in each frequency domain resource block, among the N frequency domain resource blocks used to to-be-transmitted data, is the same.

For example, based on the above embodiments of the present disclosure, the first processing and the second processing each include at least one of: a Fourier transform, and an inverse Fourier transform.

In an embodiment of the present disclosure, a processing on to-be-transmitted data on each frequency domain resource block and a joint processing on data sequences on the N frequency domain resource blocks may include a Fourier transform and an inverse Fourier transform, where the Fourier transform may be an operation that converts data from time domain to frequency domain, and the inverse Fourier transform may be an operation that converts data from frequency domain to time domain.

For example, based on the above embodiments of the present disclosure, frequency spacings of adjacent frequency domain resource blocks among the N frequency domain resource blocks are equal.

In an embodiment of the present disclosure, frequency domain spacings of adjacent frequency domain resource blocks among the N frequency domain resource blocks are equal, where the frequency domain spacing may refer to a difference value between center frequency points of adjacent frequency domain resource blocks.

For example, based on the above embodiments of the present disclosure, frequency domain bandwidths of the N frequency domain resource blocks are equal.

Herein, the frequency domain bandwidth may represent a frequency range of subcarriers included in the frequency domain resource block, that is, a difference value between the highest frequency and the lowest frequency of the subcarriers, plus a subcarrier spacing.

For example, frequency ranges of subcarriers included in the N frequency domain resource blocks for transmitting to-be-transmitted data are the same.

For example, based on the above embodiments of the present disclosure, numbers of subcarriers included in the N frequency domain resource blocks respectively are different.

In an embodiment of the present disclosure, numbers of subcarriers included in the N frequency domain resource blocks for transmitting the to-be-transmitted data may be different. For example, the frequency domain resource block A may include 4 subcarriers, and the frequency domain resource block B may include 8 subcarriers.

For example, based on the above embodiments of the present disclosure, a ratio of numbers of subcarriers included in any two frequency domain resource blocks meets: 2 to the power of i, where i is an integer.

For example, numbers of subcarriers of the N frequency domain resource blocks may be the same or different. A ratio of numbers of subcarriers of any two frequency domain resource blocks is 2 to the power of i, where a value of i is an integer. When i is 0, it may indicate that the numbers of subcarriers included in two frequency domain resource blocks are both equal, and when i is not 0, it may indicate that the numbers of subcarriers included in the two frequency domain resource blocks are not equal. It can be understood that, the numbers of subcarriers included in the N frequency domain resource blocks may not be all equal. For example, the number of subcarriers of the frequency domain resource block A is 8, the number of subcarriers of the frequency domain resource block B is 4, and the number of subcarriers of the frequency domain resource block C is 2. For another example, the number of subcarriers of the frequency domain resource block A is 8, the number of subcarriers of the frequency domain resource block B is 4, and the number of subcarriers of the frequency domain resource block C is also 4.

For example, based on the above embodiments of the present disclosure, spacings of adjacent subcarriers in the N frequency domain resource blocks are equal.

In an embodiment of the present disclosure, spacings of any adjacent subcarriers, among subcarriers included in the N frequency domain resource blocks, are equal, where the subcarrier spacing may represent a frequency difference value between the subcarriers.

For example, based on the above embodiments of the present disclosure, a ratio of spacings of adjacent subcarriers in any two frequency domain resource blocks meets: 2 to the power of i, where i is an integer.

For example, a ratio value of spacings of adjacent subcarriers included in any two frequency domain resource blocks among the N frequency domain resource blocks meets 2 to the power of i, where the value of i is an integer. When i is 0, it may indicate that spacings of adjacent subcarriers included in two frequency domain resource blocks are equal, and when i is not 0, it may indicate that spacings of adjacent subcarriers included in the two frequency domain resource blocks are not equal.

Figure 2:
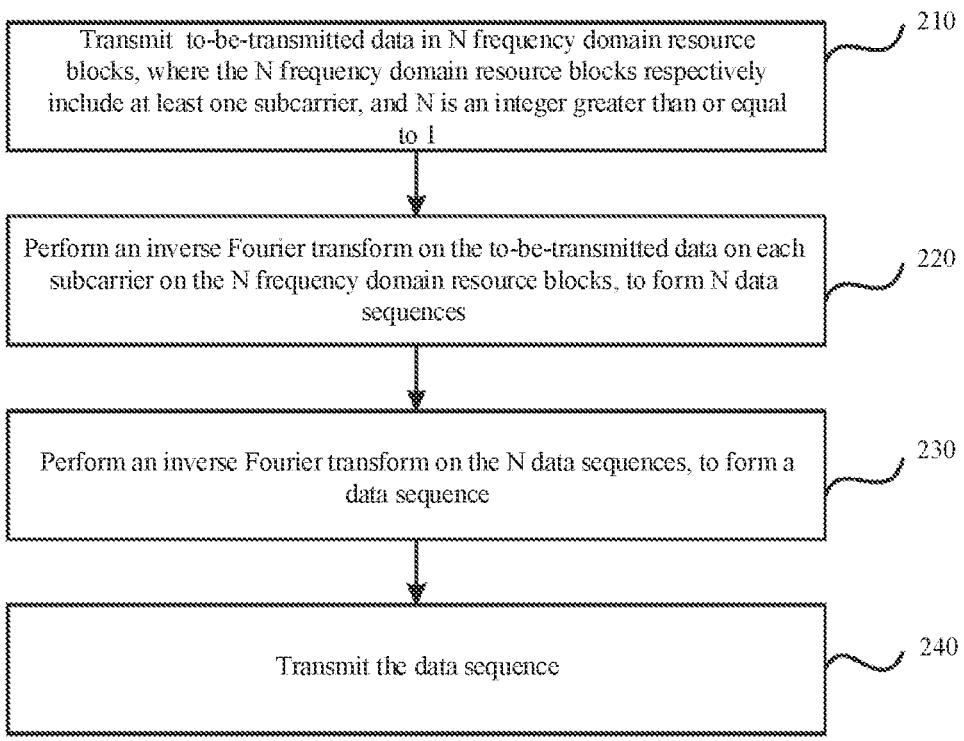
FIG. 2 is a flow chart of another data transmission method provided by an embodiment of the present disclosure.

FIG. 2 is a flow chart of another data transmission method provided by an embodiment of the present disclosure. The embodiment of the present disclosure is detailed on the basis of the above embodiments of the present disclosure. Referring to FIG. 2, the method provided by the embodiment of the present disclosure includes the following steps.

Step 210: transmitting to-be-transmitted data in N frequency domain resource blocks, where the N frequency domain resource blocks include at least one subcarrier respectively, and N is an integer greater than or equal to 1.

Step 220: performing an inverse Fourier transform on the to-be-transmitted data on subcarriers on the N frequency domain resource blocks respectively, to form N data sequences, where a number of operation points of the inverse Fourier transform is greater than or equal to a number of subcarriers included in a corresponding frequency domain resource block.

Herein, the number of operation points may be a number of points for performing frequency domain sampling upon converting data from frequency data to time domain data.

In an embodiment of the present disclosure, the inverse Fourier transform is performed on the to-be-transmitted data on each frequency domain resource block on the N frequency domain resource blocks, and the to-be-transmitted data is converted from frequency domain to time domain, then the to-be-transmitted data on which the inverse Fourier transform is performed may be recorded as a data sequence, and each frequency domain resource block may correspond to a data sequence. It can be understood that, a number of operation points used upon performing the inverse Fourier transform on each frequency domain resource block is greater than or equal to a number of subcarriers of the frequency domain resource block.

Step 230: performing an inverse Fourier transform on the N data sequences to form a time domain data sequence; where a number of operating points of the inverse Fourier transform is greater than or equal to a value of N.

For example, the inverse Fourier transform processing may be performed on the generated N data sequences together, and a processing result may be used as a time domain data sequence. It can be understood that, a number of operating points of the inverse Fourier transform processing may be greater than or equal to a value of N.

In an exemplary implementation, the inverse Fourier transform is an oversampled inverse Fourier transform.

In an embodiment of the present disclosure, step 220 "performing an inverse Fourier transform on the to-be-transmitted data on subcarriers on the N frequency domain resource blocks respectively, to form N data sequences" and step 230 "performing an inverse Fourier transform on the N data sequences to form a time domain data sequence" perform inverse Fourier transforms twice at different levels, so that different resource blocks may include different numbers of subcarriers, that is, subcarrier spacings within different resource blocks may be different, and even if numbers of points of the inverse Fourier transform performed within different resource blocks are different, subsequent inverse Fourier transforms will not be affected at the other levels, so as to perform an inverse Fourier transform on subbands with different subcarrier spacings together. And in the subsequent process, a poly-phase filter may be used for processing, to implement filtering at a resource block (or subband) level, which can reduce the complexity of processing and reduce the out-of-band leakage better.

Step 240: transmitting the data sequence.

For example, based on the above embodiments of the present disclosure, the inverse Fourier transform includes an oversampled inverse Fourier transform, and a part of subcarriers in the frequency domain resource block is used for data transmission.

In the embodiment of the present disclosure, a processing on the to-be-transmitted data on each frequency domain resource block and a Fourier transform performed jointly on data sequences on the N frequency domain resource blocks may be an oversampled Fourier transform, and each frequency domain resource block only uses a part of subcarriers included in the frequency domain resource block for data transmission. The remaining subcarriers of subcarriers in the frequency domain resource block do not transmit data or data transmitted on the remaining subcarriers of subcarriers in the frequency domain resource block is 0.

For example, based on the above embodiments of the present disclosure, the inverse Fourier transform includes an oversampled inverse Fourier transform, subcarriers located in a central area in the frequency domain resource block are used to transmit data, and subcarriers located in an edge area in the frequency domain resource block transmit no data.

Herein, the subcarriers of the central area may be some subcarriers with transmitting positions being located in a middle area in each frequency domain resource block, the frequency of the subcarrier of the central area may be located in the middle area of the frequency domain bandwidth of each frequency domain resource block, and correspondingly, the subcarriers in the edge area may be some subcarriers with transmitting positions being located at an edge in each frequency domain resource block, and the frequency of the subcarrier of the edge area may be located at an edge area position of the frequency domain bandwidth of each frequency domain resource block.

In the embodiment of the present disclosure, the Fourier transform performed in the N frequency domain resource blocks is an oversampled Fourier transform, a part of subcarriers in the frequency domain resource block are used to transmit data, and subcarriers located in the middle area in each frequency domain resource block may be used to transmit data, and subcarriers located in the edge area are used to transmit no data, or data used to be transmitted is 0.

For example, based on the above embodiments of the present disclosure, in a case where numbers of subcarriers included in the N frequency domain resource blocks are different, time domain lengths of the N data sequences are different.

In an embodiment of the present disclosure, in a case where numbers of subcarriers of the N frequency domain resource blocks are different, the lengths of the N data sequences generated respectively through the inverse Fourier transform processing may be different in the time domain.

For example, based on the above embodiments of the present disclosure, in a case where a ratio of numbers of subcarriers included in any two frequency domain resource blocks meets: 2 to the power of i, a ratio of time domain lengths of two data sequences generated through the inverse Fourier transform processing also meets the condition of 2 to the power of i, where i is an integer.

For example, for N frequency domain resource blocks transmitting to-be-transmitted data, a ratio of numbers of subcarriers included in any two frequency domain resource blocks is 2 to the power of i, and a ratio of time domain lengths of two data sequences generated through the inverse Fourier transform processing is also 2 to the power of i, where i is an integer. If i is 0, the time domain lengths of the generated data sequences are the same, and if i is not 0, the lengths of the generated data sequences are different.

For example, based on the above embodiments of the present disclosure, the time domain data sequence is generated by serially connecting multiple data sequences generated by performing multiple inverse Fourier transforms on the N data sequences.

In an embodiment of the present disclosure, after the inverse Fourier transform is performed on N data sequences jointly, the multiple data sequences generated through the inverse Fourier transform may be serially connected in sequence into a time domain data sequence.

For example, based on the above embodiments of the present disclosure, before the inverse Fourier transform is performed on the N data sequences, the method further includes: adding a cyclic prefix (CP) to the N data sequences respectively.

Herein, the cyclic prefix (CP) may be information generated by copying a tail symbol to a head, where the cyclic prefix may include a normal cyclic prefix and an extended cyclic prefix, and the cyclic prefix may be used to reduce inter-symbol interference and inter-channel interference.

In an embodiment of the present disclosure, cyclic prefixes may be added to the N data sequences respectively, to reduce inter-symbol interference and inter-channel interference in the process of data transmission.

For example, based on the above embodiments of the present disclosure, before the inverse Fourier transform is performed on the N data sequences, the method further includes: adding a guard interval (GI) to the N data sequences respectively, where the guard interval is null data.

In an embodiment of the present disclosure, the null data may be added to the N data sequences respectively, to form a guard interval (GI), to guarantee that subcarriers in multiple frequency domain resource blocks remain orthogonal under a multi-path delay channel.

For example, based on the above embodiments of the present disclosure, upon transmitting the data sequence, the method includes: filtering the data sequence, where the filtering includes a single-phase filtering, and/or a polyphase filtering.

For example, upon transmitting the data sequence, the data sequence may further be filtered to shield a specific fluctuation frequency in the transmitted data signal, to reduce interference in data transmission, where the filtering mode may include a single-phase filtering and/or a polyphase filtering.

For example, based on the above embodiments of the present disclosure, a filtering function used by the filtering includes at least one of: a root raised cosine function, a raised cosine function, a rectangular function, and an isotropic orthogonal transformation algorithm function.

For example, functions such as a root raised cosine function, a raised cosine function, a rectangular function, and an isotropic orthogonal transformation algorithm function, etc., may be used to filter the transmitted data sequence, to reduce transmission interference of data.

For example, based on the above embodiments of the present disclosure, upon transmitting the data sequence, the method includes: performing a windowing operation on the data sequence.

Herein, the windowing operation may group the data sequence, then perform a periodic extension on each data sequence being grouped, then dot-multiply a preset function by each data sequence being performed the periodic extension, and then perform a dislocation superposition between multiple data sequences being dot-multiplied.

In an embodiment of the present disclosure, a window function of a scene in the windowing operation may include a rectangular window, a triangular window, a Hanning window, a Hamming window and a Gaussian window, etc.

For example, based on the above embodiments of the present disclosure, the to-be-transmitted data includes constellation point modulation data and/or reference signal data.

In an exemplary implementation, a processing on the to-be-transmitted data on each frequency domain resource block may include one or more of: a Fourier transform, an inverse Fourier transform, a cyclic prefix adding, a guard interval adding, and adding a reference signal.

For example, based on the above embodiments of the present disclosure, performing the second processing on the N data sequences includes: an operation of adding M zero data sequences, where M is an integer.

In an embodiment of the present disclosure, upon performing the second processing on the N data sequences, the M zero data sequences may also be combined with the N data sequences to form M+N data sequences, where a value of M may be the same as a value of N or different from a value of N. Herein, the zero data sequence may be a data sequence only including zero, and the length of the data sequence may not be limited. Then, the M+N data sequences are processed, where the processing may include an oversampled inverse Fourier transform processing.

Figure 3:
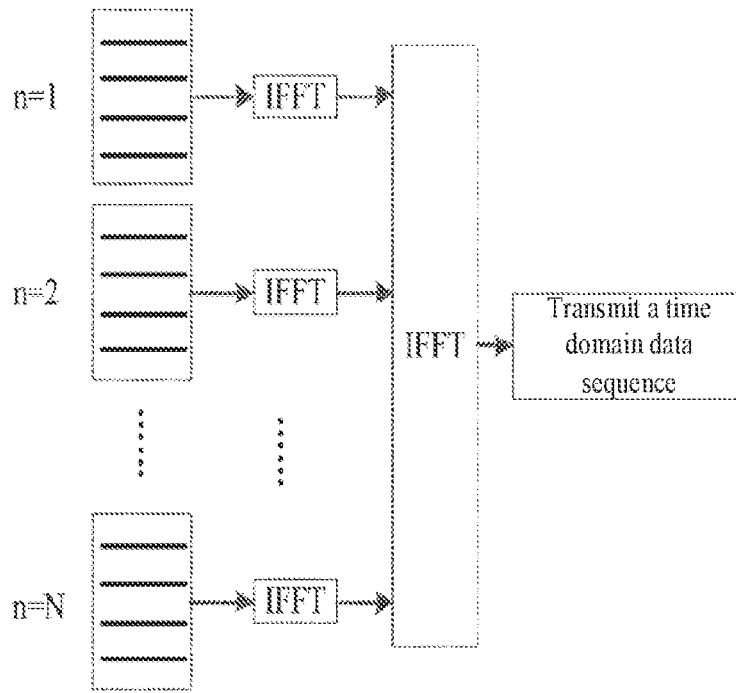
FIG. 3 is an example diagram of a data transmission method provided by an embodiment of the present disclosure.

In an exemplary implementation, referring to FIG. 3, the to-be-transmitted data is transmitted in the N frequency domain resource blocks, and $k(n)$ subcarriers are included in the N frequency domain resource blocks respectively, and numbers of subcarriers included in each frequency domain resource block is the same. In FIG. 3, $k(n)=4$, in the process of data transmission, an inverse fast Fourier transform (IFFT) may be performed on to-be-transmitted data on the $k(n)$ subcarriers of each frequency domain resource block respectively, to form N time domain data sequences, and frequency domain resource positions in which these N time domain data sequences are located, are different, and then an inverse Fourier transform is performed on the N time domain data sequences to form a time domain data sequences. This time domain data sequence can be transmitted.

Figure 4:
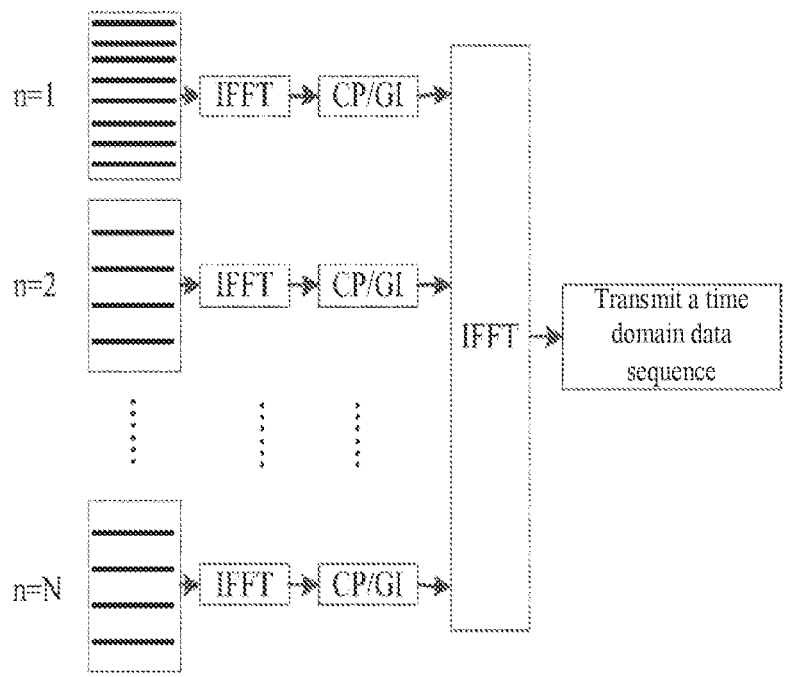
FIG. 4 is an example diagram of a data transmission method provided by an embodiment of the present disclosure.

In another exemplary implementation, referring to FIG. 4, the to-be-transmitted data is transmitted in the N frequency domain resource blocks, and the N resource blocks include $k(n)$ subcarriers respectively. In this embodiment, a number of subcarriers included in a first resource block is 8, that is, $k(1)=8$, and numbers of subcarriers included in other resource blocks are 4, as shown in FIG. 4. A ratio of a number of subcarriers included in the first resource block to a number of subcarriers included in any one of the other resource blocks is 2 to the power of i (i.e., $2^i$), and in this embodiment, i=1. Frequency domain bandwidths of the N resource blocks are equal, so a ratio of a spacing of adjacent subcarriers of the first resource block and a spacing of adjacent subcarriers of any one of the other resource blocks is 2 to the power of j (that is, $2^j$), and in this embodiment, j=−1. Among the N frequency domain resource blocks, frequency domain spacings of adjacent frequency domain resource blocks are equal.

An inverse Fourier transform is performed on the to-be-transmitted data on $k(n)$ subcarriers of each resource block, to form N time domain data sequences. Since a number of subcarriers included in the first resource block is 8 and numbers of subcarriers included in the other resource blocks are 4, a number of IFFT points performed on to-be-transmitted data on the first resource block will be greater than a number of IFFT points performed on to-be-transmitted data on the other resource blocks. A ratio of each time domain data sequence length via IFFT corresponding to the first resource block to each time domain data sequence length via IFFT corresponding to the other resource blocks meets 2 to the power of i (that is, $2^i$), and in this embodiment, i=1. Therefore, for the other resource blocks, two time domain data sequences need to be connected serially, to be equal to a time domain length of one time domain data sequence of the first resource block. In this embodiment, IFFT may be oversampled or non-oversampled. When a number of pieces of to-be-transmitted data on each resource block is less than $k(n)$, an oversampled IFFT is implemented by filling zero; when a number of pieces of to-be-transmitted data on each resource block is equal to $k(n)$, IFFT may be non-oversampled or oversampled. After an inverse Fourier transform is performed on to-be-transmitted data on $k(n)$ subcarriers of each resource block, a cyclic prefix (CP) or a guard interval (GI) may be added, or the CP and GI may not be added. Then, an inverse Fourier transform is performed on N time domain data sequences to form a time domain data sequences. This time domain data sequences can be transmitted.

Figure 5:
FIG. 5 is an example diagram of a data transmission method provided by an embodiment of the present disclosure.

In another exemplary implementation, FIG. 5 is an example diagram of a data transmission method provided by an embodiment of the present disclosure. Referring to FIG. 5, to-be-transmitted data is transmitted in the N frequency domain resource blocks, and the N resource blocks include $k(n)$ subcarriers respectively. In this embodiment, N=1, $k(n)=1$, and at this time, it is a single-carrier waveform, and to-be-transmitted data in the time domain is transmitted on the single-carrier. The serial to-be-transmitted data in the time domain is divided into multiple groups, and CP or GI is added to each group, or the CP and GI are not added. Then, the data, goes through the oversampled IFFT, or is repeated L times directly, L>=2. Then, the time domain data sequences is transmitted.

Figure 6:
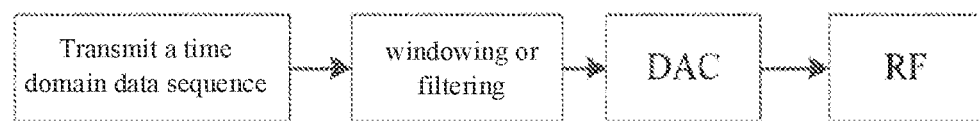
FIG. 6 is an example diagram of a data transmission method provided by an embodiment of the present disclosure.

In another exemplary implementation, FIG. 6 is an example diagram of a data transmission method provided by an embodiment of the present disclosure. Referring to FIG. 6, based on the above embodiments of the present disclosure, upon transmitting the time domain data sequence, the method further includes: performing windowing or filtering on the time domain data sequence. Then, a digital to analog convertor (DAC) and a radio frequency (RF) process are further performed. The windowing processing includes: grouping the time domain data sequence, then performing a periodic extension on each data sequence being grouped, then dot-multiplying a preset function by each data sequence being performed the periodic extension, and then performing a dislocation superposition between multiple data sequences being dot-multiplied. The filtering includes: a single-phase filtering and a poly-phase filtering. The single-phase filtering is a normal filtering; and the poly-phase filtering requires joint processing of multiple filterings.

Figure 7:
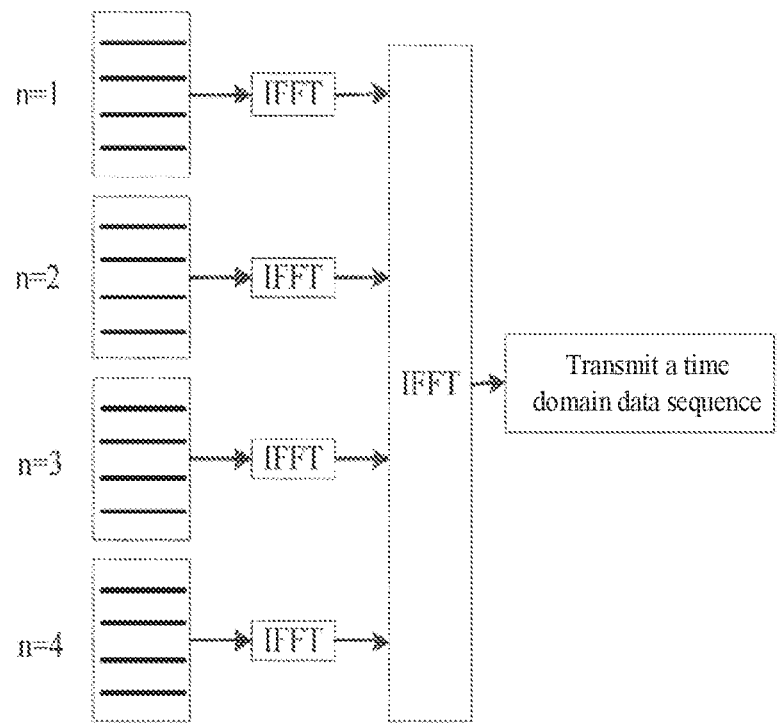
FIG. 7 is an example diagram of a data transmission method provided by an embodiment of the present disclosure.

For example, FIG. 7 is a flow diagram of a data transmission method provided by an embodiment of the present disclosure. Referring to FIG. 7, in the embodiments of the present disclosure, to-be-transmitted data is transmitted in the N frequency domain resource blocks, the N resource blocks include k(n) subcarriers respectively; and in this embodiment, N=4, numbers of subcarriers included in these 4 resource block are the same, and k(n)=4. In an embodiment of the present disclosure, to-be-transmitted data in a first resource block is (a1, a2, a3, a4) respectively, to-be-transmitted data in a second resource block is (b1, b2, b3, b4) respectively, and to-be-transmitted data in a third resource block is (c1, c2, c3, c4) respectively, and to-be-transmitted data in a fourth resource block is (d1, d2, d3, d4) respectively. An inverse Fourier transform is performed on to-be-transmitted data on k(n) subcarriers of each resource block to form N time domain data sequences. In an embodiment of the present disclosure, a number of IFFT points of the inverse Fourier transform is 4, that is, oversampling is not performed, and thus, after the inverse Fourier transform is performed on the to-be-transmitted data on the 4 resource blocks, 4 time domain data sequences are obtained as follows: (a'1, a'2, a'3, a'4), (b'1, b'2, b'3, b'4), (c'1, c'2, c'3, c'4), (d'1, d'2, d'3, d'4) respectively.

Then, an inverse Fourier transform is performed on the N time domain data sequences, to form a time domain data sequences. In this embodiment, a number of IFFT points of the inverse Fourier transform is N, that is, the oversampling is not performed. Therefore, after performing IFFT with 4 points on (a'1, b'1, c'1, d'1), the output is (p1, p2, p3, p4); after performing IFFT with 4 points on (a'2, b'2, c'2, d'2), the output is (q1, q2, q3, q4); after performing IFFT with 4 points on (a'3, b'3, c'3, d'3), the output is (r1, r2, r3, r4); after performing IFFT with 4 points on (a'4, b'4, c'4, d'4), the output is (s1, s2, s3, s4). These 4 time domain data sequences are connected serially to form a time domain data sequence (p1, p2, p3, p4, q1, q2, q3, q4, r1, r2, r3, r4, s1, s2, s3, s4). This time domain data sequence is transmitted.

Figure 8:
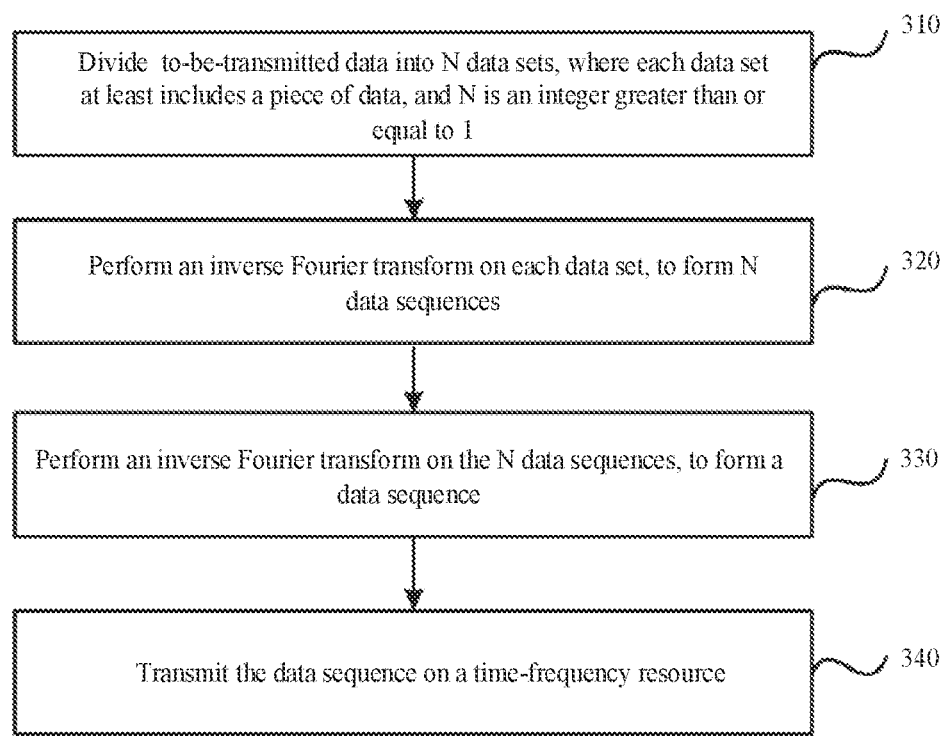
FIG. 8 is a flow chart of a data modulation method provided by an embodiment of the present disclosure.

FIG. 8 is a flow chart of a data modulation method provided by an embodiment of the present disclosure, the embodiment of the present disclosure may be applied to a case of supporting the multi-waveform scheme in communication, the method may be performed by a data transmission apparatus, the apparatus may be implemented in a software and/or hardware manner, and is generally integrated in a base station or a communication terminal. Referring to FIG. 8, the method provided by the embodiment of the present disclosure includes the following steps.

Step 310: dividing to-be-transmitted data into N data sets, where each data set of the N data sets at least includes a piece of data, and N is an integer greater than or equal to 1.

In an embodiment of the present disclosure, the to-be-transmitted data may be divided into multiple data sets, where each data set includes at least one piece of data.

Step 320: performing an inverse Fourier transform on the each data set, to form N data sequences.

For example, an inverse Fourier transform may be performed on data in each data set to form N data sequences.

Step 330: performing an inverse Fourier transform on the N data sequences, to form a data sequence; and for example, an inverse Fourier transform may be performed on the generated N data sequences to form a data sequence.

Step 340: transmitting the data sequence on a time-frequency resource.

In the embodiment of the present disclosure, to-be-transmitted data is divided into multiple data sets, an inverse Fourier transform is performed on each data set to form multiple data sequences, an inverse Fourier transform is performed on the multiple data sequences to generate a data sequence, and then, the data sequence is transmitted in the time-frequency resource, thus the support of multiple groups of waveform schemes can be implemented, the waste of transmission resources is reduced, the out-of-band leakage can be reduced, and further, the communication efficiency of devices is improved.

In an embodiment of the present disclosure, the generated data sequence may be transmitted on a time domain resource.

For example, based on the above embodiments of the present disclosure, a number of pieces of data included in each data set among the N data sets is different.

In an embodiment of the present disclosure, among the N data sets generated by dividing the to-be-transmitted data, a number of pieces of data included in each data set may be the same.

For example, based on the above embodiments of the present disclosure, a ratio of numbers of pieces of data included in any two data sets meets: 2 to the power of i, where i is an integer.

In an embodiment of the present disclosure, a ratio of numbers of pieces of data included in any two data sets may be 2 to the power of i, where i is an integer. When i is zero, numbers of pieces of data in two data sets are the same, and when i is not zero, numbers of pieces of data in two data sets are different.

For example, based on the above embodiments of the present disclosure, each data set includes at least one subset, and in the same data set, a number of pieces of data included in each subset is the same.

For example, each data set may also include multiple subsets, and each subset may include at least one piece of data, where numbers of pieces of data included in subsets belonging to the same data set are the same. It can be understood that, when each data set includes one subset, the data set and the subset are the same.

For example, based on the above embodiments of the present disclosure, a number of operation points of an inverse Fourier transform performed on the N data sets is greater than or equal to a number of pieces of data included in a subset of the corresponding data set.

In an embodiment of the present disclosure, a number of operation points of an inverse Fourier transform operation performed on each data set is greater than or equal to a number of pieces of data included in the corresponding data set.

For example, based on the above embodiments of the present disclosure, a number of operating points of an inverse Fourier transform performed on the N data sequences is greater than or equal to a value of N.

For example, when an inverse Fourier transform is performed on the N data sequences, a number of operating points of an inverse Fourier transform is greater than or equal to the value of N, i.e., a number of data sets.

For example, based on the above embodiments of the present disclosure, the data sequence is generated by serially connecting multiple data sequences generated by performing multiple inverse Fourier transforms on the N data sequences.

For example, based on the above embodiments of the present disclosure, before performing inverse Fourier transforms on the N data sequences, the method further includes: adding a guard interval (GI) to the N data sequences respectively, where the guard interval is null data.

For example, based on the above embodiments of the present disclosure, transmitting the data sequence on the time-frequency resource includes: filtering the data sequence, where the filtering includes a single-phase filtering and/or a poly-phase filtering.

For example, based on the above embodiments of the present disclosure, a filtering function used by the filtering includes at least one of: a root raised cosine function, a raised cosine function, a rectangular function, and an isotropic orthogonal transformation algorithm function.

Figure 9:
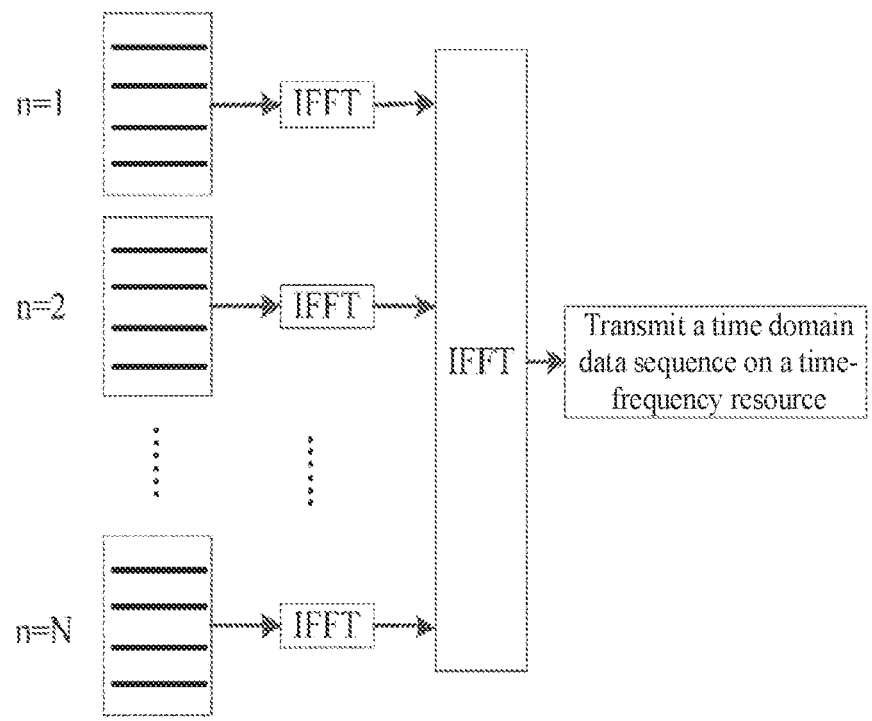
FIG. 9 is an example diagram of a data modulation method provided by an embodiment of the present disclosure.

In an exemplary implementation, FIG. 9 is an example diagram of a data modulation method provided by an embodiment of the present disclosure. Referring to FIG. 9, the method of the embodiment of the present disclosure includes the following steps: dividing a to-be-transmitted data sequence into N groups, each group includes k(n) pieces of data, and in this embodiment, a number of pieces of data included in each group is the same, and k(n)=4. An inverse Fourier transform is performed on each data sequence to form N data sequences. Then, an inverse Fourier transform is performed on N data sequences to form a data sequence. This data sequence is transmitted on a time-frequency resource.

Figure 10:
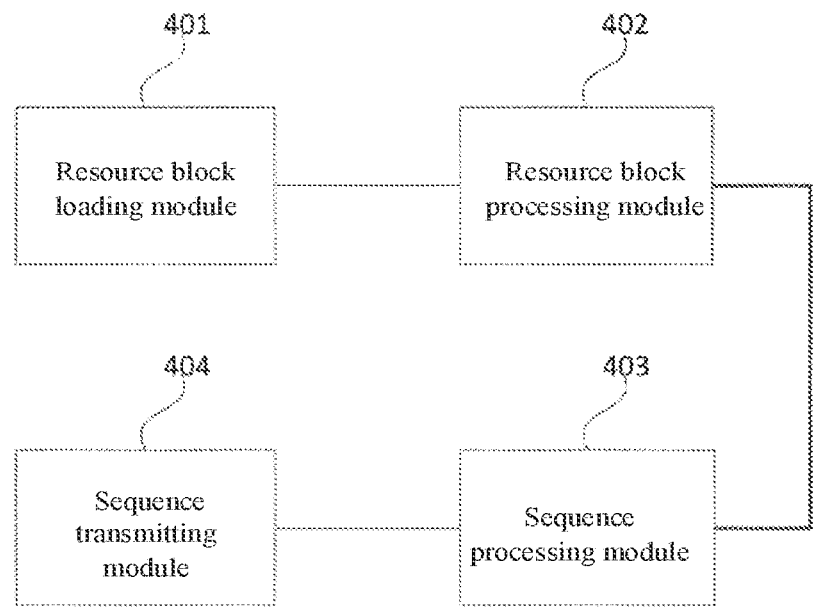
FIG. 10 is a structural diagram of a data transmission apparatus provided by an embodiment of the present disclosure.

FIG. 10 is a structural diagram of a data transmission apparatus provided by an embodiment of the present disclosure, the apparatus may perform the data transmission method provided by any embodiment of the present disclosure and has the corresponding functional modules and beneficial effects for performing the method, and the apparatus may be implemented by software and/or hardware, and includes: a resource block loading module 401, a resource block processing module 402, a sequence processing module 403 and a sequence transmitting module 404.

The resource block loading module 401 is configured to transmit to-be-transmitted data in N frequency domain resource blocks, where the N frequency domain resource blocks include at least one subcarrier respectively, and N is an integer greater than or equal to 1.

The resource block processing module 402 is configured to perform a first processing on to-be-transmitted data on each frequency domain resource block of the N frequency domain resource blocks, to form N data sequences.

The sequence processing module 403 is configured to perform a second processing on the N data sequences to form a data sequence.

The sequence transmitting module 404 is configured to transmit the data sequence.

In an embodiment of the present disclosure, the to-be-transmitted data is transmitted in multiple frequency domain resource blocks through the resource block loading module, where each frequency domain resource block includes at least one subcarrier, the resource block processing module performs a first processing on the to-be-transmitted data on each frequency domain resource block to generate multiple data sequences, the sequence processing module performs a second processing on the multiple data sequences simultaneously to form a data sequence, and the sequence transmitting module transmits the generated data sequence, thus the support of the multiple groups of wave schemes is implemented, the waste of transmission resources is reduced, the out-of-band leakage can be reduced, and further, the communication efficiency of devices is improved.

For example, based on the above embodiments of the present disclosure, numbers of subcarriers included in the N frequency domain resource blocks respectively are the same.

For example, based on the above embodiments of the present disclosure, the first processing and the second processing respectively include at least one of: a Fourier transform and an inverse Fourier transform.

For example, based on the above embodiments of the present disclosure, frequency domain spacings of adjacent frequency domain resource blocks among the N frequency domain resource blocks are equal.

For example, based on the above embodiments of the present disclosure, frequency domain bandwidths of the N frequency domain resource blocks are equal.

For example, based on the above embodiments of the present disclosure, numbers of subcarriers included in the N frequency domain resource blocks respectively are different.

For example, based on the above embodiments of the present disclosure, in the apparatus, a ratio of numbers of subcarriers included in any two frequency domain resource blocks meets: 2 to the power of i, where i is an integer.

For example, based on the above embodiments of the present disclosure, in the apparatus, spacings of adjacent subcarriers in the N frequency domain resource blocks are equal.

For example, based on the above embodiments of the present disclosure, in the apparatus, a ratio of spacings of adjacent subcarriers in any two frequency domain resource blocks meets: 2 to the power of i, where i is an integer.

For example, based on the above embodiments of the present disclosure, in the apparatus, the resource block processing module 402 includes:

an inverse Fourier transform unit, configured to perform an inverse Fourier transform on the to-be-transmitted data on the subcarrier on the N frequency domain resource blocks respectively, where a number of operating points of the inverse Fourier transform is greater than or equal to a number of subcarriers included in the corresponding frequency domain resource block.

For example, based on the above embodiments of the present disclosure, in the apparatus, the inverse Fourier transform includes an oversampled inverse Fourier transform, and a part of the subcarrier in the frequency domain resource block is used to transmit data.

For example, based on the above embodiments of the present disclosure, in the apparatus, the inverse Fourier transform includes an oversampled inverse Fourier transform, and subcarriers located in a central area in the frequency domain resource block are used to transmit data, and subcarriers located in an edge area in the frequency domain resource block transmit no data.

For example, based on the above embodiments of the present disclosure, in the apparatus, in a case where numbers of subcarriers included in the N frequency domain resource blocks are different, time domain lengths of the N data sequences are different.

For example, based on the above embodiments of the present disclosure, in the apparatus, in a case where a ratio of numbers of subcarriers included in any two frequency domain resource blocks meets: 2 to the power of i, a ratio of time domain lengths of two data sequences generated through the inverse Fourier transform processing also meets the condition of 2 to the power of i, where i is an integer.

For example, based on the above embodiments of the present disclosure, in the apparatus, the sequence processing module 403 includes:
  a subband processing unit, configured to perform an inverse Fourier transform on the N data sequences to form a time domain data sequence; where a number of operating points of the inverse Fourier transform is greater than or equal to a value of N.

For example, based on the above embodiments of the present disclosure, in the apparatus, the inverse Fourier transform is an oversampled inverse Fourier transform.

For example, based on the above embodiments of the present disclosure, in the apparatus, the time domain data sequence is generated by serially connecting multiple data sequences generated by performing multiple inverse Fourier transforms on the N data sequences.

For example, based on the above embodiments of the present disclosure, the apparatus further includes: a cyclic prefix adding module, configured to add a cyclic prefix (CP) to the N data sequences respectively.

For example, based on the above embodiments of the present disclosure, the apparatus further includes: a guard interval adding module, configured to add a guard interval (GI) to the N data sequences respectively, where the guard interval is null data.

For example, based on the above embodiments of the present disclosure, the sequence transmitting module 404 of the apparatus includes:
  a filtering unit, configured to filter the data sequence, where the filtering includes a single-phase filtering, and/or a poly-phase filtering.

For example, based on the above embodiments of the present disclosure, in the apparatus, a filtering function used by the filtering includes at least one of: a root raised cosine function, a raised cosine function, a rectangular function, and an isotropic orthogonal transformation algorithm function.

For example, based on the above embodiments of the present disclosure, the apparatus further includes: a windowing module, configured to perform a windowing operation on the data sequence.

For example, based on the above embodiments of the present disclosure, in the apparatus, the to-be-transmitted data includes constellation point modulation data and/or reference signal data.

For example, based on the above embodiments of the present disclosure, in the apparatus, the resource block processing module 402 is configured to perform at least one of the following: performing a Fourier transform on the to-be-transmitted data; performing an inverse Fourier transform on the to-be-transmitted data; adding a cyclic prefix (CP) to the to-be-transmitted data; adding a guard interval (GI) to the to-be-transmitted data; adding a reference signal (RS) to the to-be-transmitted data.

For example, based on the above embodiments of the present disclosure, the sequence processing module 403 further includes: a sequence adding unit, configured to add M zero data sequences, where M is an integer.

Figure 11:
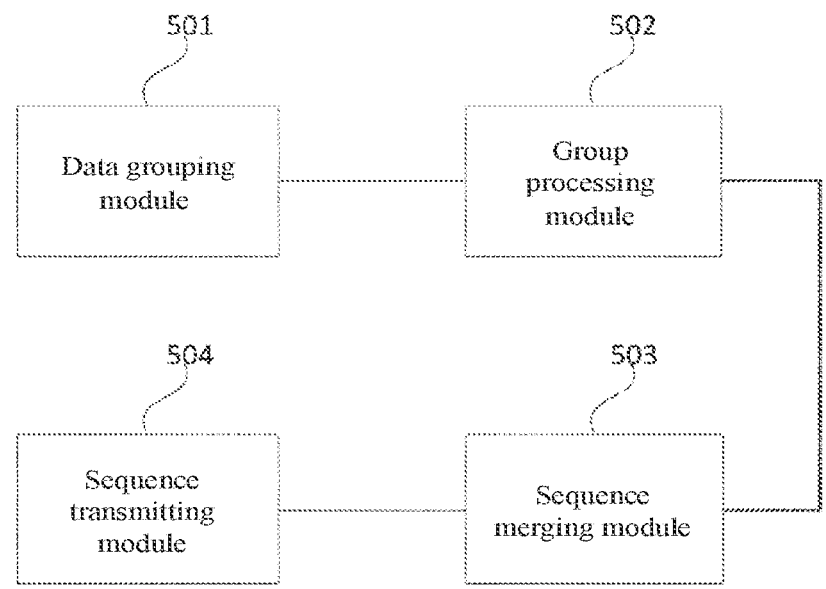
FIG. 11 is a structural diagram of a data modulation apparatus provided by an embodiment of the present disclosure.

FIG. 11 is a structural diagram of a data modulation apparatus provided by an embodiment of the present disclosure, the apparatus may perform the data modulation method provided by any embodiment of the present disclosure, and has the corresponding function modules and beneficial effects for performing the method, the apparatus may be implemented by software and/or hardware, and include: a data grouping module 501, a grouping processing module 502, a sequence merging module 503 and a sequence transmitting module 504.

The data grouping module 501 is configured to group to-be-transmitted data into N data sets, where each data set of the N data sets at least includes a piece of data, where N is an integer greater than or equal to 1.

The grouping processing module 502 is configured to perform an inverse Fourier transform on the each data set, to form N data sequences.

The sequence merging module 503 is configured to perform an inverse Fourier transform on the N data sequences, to form a data sequence.

The sequence transmitting module 504 is configured to transmit the data sequence on a time-frequency resource.

In an embodiment of the present disclosure, the data grouping module divides to-be-transmitted data into multiple data sets, the grouping processing module performs an inverse Fourier transform on each data set to form multiple data sequences, the sequence merging module performs an inverse Fourier transform on the multiple data sequences to generate a data sequence, the sequence transmitting module transmits the data sequence on a time-frequency resource, thus the support of multiple groups of waveform schemes is implemented, the waste of transmission resources is reduced, the out-of-band leakage can be reduced, and further, the communication efficiency of devices is improved.

For example, based on the above embodiments of the present disclosure, in the apparatus, a number of pieces of data included in each data set among the N data sets is different.

For example, based on the above embodiments of the present disclosure, in the apparatus, a ratio of numbers of pieces of data included in any two data sets meets: 2 to the power of i, where i is an integer.

For example, based on the above embodiments of the present disclosure, in the apparatus, each data set includes at least one subset, and in the same data set, numbers of pieces of data included in each subset are the same.

For example, based on the above embodiments of the present disclosure, in the apparatus, a number of operation points of the inverse Fourier transform performed on the N data sets is greater than or equal to a number of pieces of data included in a subset of the corresponding data set.

For example, based on the above embodiments of the present disclosure, in the apparatus, a number of operating points of an inverse Fourier transform performed on the N data sequences is greater than or equal to a value of N.

For example, based on the above embodiments of the present disclosure, in the apparatus, the data sequence is generated by serially connecting multiple data sequences generated by performing multiple inverse Fourier transforms on the N data sequences.

For example, based on the above embodiments, the apparatus further includes: a cyclic prefix adding module, configured to add a cyclic prefix (CP) to the N data sequences respectively.

For example, based on the above embodiments, the apparatus further includes: a guard interval adding module, configured to add a guard interval (GI) to the N data sequences respectively, where the guard interval is null data.

For example, based on the above embodiments, in the apparatus, the sequence transmitting module 504 is further configured to filter the data sequence, where the filtering includes a single-phase filtering and/or a poly-phase filtering.

For example, based on the above embodiments of the present disclosure, in the apparatus, a filtering function used by the filtering includes at least one of: a root raised cosine function, a raised cosine function, a rectangular function, and an isotropic orthogonal transformation algorithm function.

Figure 12:
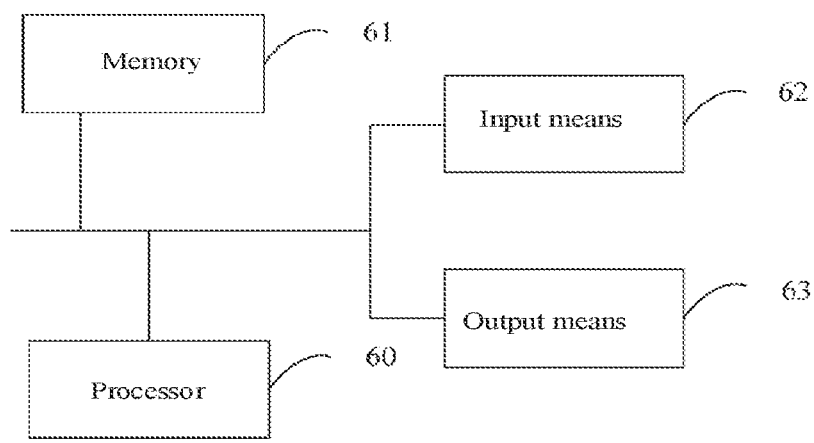
FIG. 12 is a structural diagram of an electronic device provided by an embodiment of the present disclosure.

FIG. 12 is a structural diagram of an electronic device provided by an embodiment of the present disclosure, the electronic device includes a processor 60, a memory 61, an input means 62 and an output means 63; a number of processors 60 in the electronic device may be one or more, and in FIG. 12, one processor 60 is taken as an example; the processor 60, the memory 61, the input means 62 and the output means 63 in the electronic device may be connected through a bus or in other ways, and in FIG. 12, the connection through a bus is taken as an example.

The memory 61, as a computer readable storage medium, may be configured to store a software program, a computer executable program and a module, such as modules corresponding to the data transmission apparatus or the data modulation apparatus in the embodiments of the present disclosure (the resource block loading module 401, the resource block processing module 402, the sequence processing module 403 and the sequence transmitting module 404, or the data grouping module 501, the grouping processing module 502, the sequence merging module 503 and the sequence transmitting module 504). The processor 60 performs multiple function applications and data processing of the electronic device, that is, implements the above method by running software programs, instructions and modules stored in the memory 61. The computer readable storage medium may be a non-transitory computer readable storage medium.

The memory 61 may mainly include a storage program area and a storage data area, where the storage program area may store an operating system, an application program required by at least one function; the storage data area may store data created according to the usage of the electronic device, etc. In addition, the memory 61 may include a high speed random access memory, and may also include a non-volatile memory, such as at least one magnetic disk storage means, flash memory means, or other non-volatile solid state storage means. In some instances, the memory 61 may further include memories disposed remotely with respect to the processor 60, and these remote memories may be connected to the electronic device through the network. Examples of the above networks include, but are not limited to, the Internet, an intranet, a local area network, mobile communication networks and combinations thereof.

The input means 62 may be configured to receive input digital or character information, and generate a key signal input related to the user setting and function control of the electronic device. The output means 63 may include a display device such as a display screen.

An embodiment of the present disclosure further provides a storage medium including computer executable instructions, where the computer executable instructions, upon being executed by a computer processor, are configured to perform a data transmission method, where the method includes:

transmitting to-be-transmitted data in N frequency domain resource blocks, where the N frequency domain resource blocks include at least one subcarrier respectively, and N is an integer greater than or equal to 1;

performing a first processing on to-be-transmitted data on each frequency domain resource block of the N frequency domain resource blocks, to form N data sequences;

performing a second processing on the N data sequences to form a data sequence; and transmitting the data sequence.

Alternatively, the computer executable instructions, upon being executed by a computer processor, are configured to perform a data modulation method, where the method includes:

dividing to-be-transmitted data into N data sets, where each data set of the N data sets at least includes a piece of data, and N is an integer greater than or equal to 1;

performing inverse Fourier transform on each data set, to form N data sequences;

performing an inverse Fourier transform on the N data sequences, to form a data sequence; and transmitting the data sequence on a time-frequency resource.

By the above description regarding the implementations, those skilled in the art may clearly understand that, the present disclosure may be implemented by means of a software and a necessary general hardware, and of course, may also be implemented by a hardware. Based on this understanding, the technical solutions of the present disclosure may be essentially, or a part of the technical solutions of the present disclosure that contributes to the related technology may be, embodied in the form of a software product, and the computer software product may be stored in a computer readable storage medium, such as a floppy disk, a Read-Only Memory (ROM), a Random Access Memory (RAM), a FLASH, a hard disk, or an optical disk of the computer, and includes a plurality of instructions for enabling a computer device (which may be a personal computer, a server, a network device, etc.) to perform the methods as described in the embodiments of the present disclosure.

It's worth noting that, in the embodiments of the above apparatus, multiple units and modules included therein are merely classified according to the function logic, but are not limited to the above classification, as long as the corresponding function can be implemented. In addition, the particular names of multiple function units are merely for the convenience of distinguishing from each other, and are not used to limit the protection scope of the present disclosure.

It may be understood by those skilled in the art that, all or some of the steps in the method, the function modules/units in the system and the device disclosed above may be implemented as a software, a firmware, a hardware, and a suitable combination thereof.

In a hardware implementation, the division between function modules/units mentioned in the above description does not necessarily correspond to the division of physical components; for example, a physical component may have multiple functions, or a function or a step may be performed by several physical components cooperatively. Some or all of the physical components may be implemented as a software executed by a processor, such as a central processor, a digital signal processor or a microprocessor, or implemented as a hardware, or implemented as an integrated circuit, such as an application specific integrated circuit. Such software may be distributed on a computer readable medium, which may include a computer storage medium (or a non-transitory medium) and a communication medium (or a transitory medium). As well known to those skilled in the art, the term "computer storage medium" includes volatile and non-volatile, removable and non-removable media implemented in any method or technology for storing information (e.g., computer readable instructions, data structures, program modules or other data). The computer storage medium includes, but is not limited to, RAM, ROM, EEPROM, flash or other memory technologies, CD-ROM, Digital Versatile Disk (DVD) or other optical disk storages, magnetic cassettes, tapes, disk storages or other magnetic storage means, or may be used to store desired information and any other media that may be accessed by a computer. In addition, it is well known to those skilled in the art that, a communication medium generally includes computer readable instructions, data structures, program modules or other data in a modulation data signal such as a carrier wave or other transmission mechanisms, and may include any information delivery medium.

The embodiments of the present disclosure transmit to-be-transmitted data on frequency domain resource blocks, and processes the to-be-transmitted data at the subcarrier level and at the frequency domain resource block level respectively, thus the support of multiple groups of waveform schemes is realized, the waste of transmission resources is reduced, the out-of-band leakage can be reduced, and further, the communication efficiency of devices is improved.

What is claimed is:

1. A data transmission method, comprising:
transmitting to-be-transmitted data in N frequency domain resource blocks, wherein the N frequency domain resource blocks comprise at least one subcarrier respectively, and N is an integer greater than or equal to 1;
performing an inverse Fourier transform on to-be-transmitted data on each frequency domain resource block of the N frequency domain resource blocks, to form N data sequences;
performing an inverse Fourier transform on the N data sequences to form a data sequence; and
transmitting the data sequence.

2. The method according to claim 1, wherein:
numbers of subcarriers comprised in the N frequency domain resource blocks respectively are the same; or
frequency domain spacings of adjacent frequency domain resource blocks among the N frequency domain resource blocks are equal; or
frequency domain bandwidths of the N frequency domain resource blocks are equal; or
numbers of subcarriers comprised in the N frequency domain resource blocks respectively are different; or
a ratio of numbers of subcarriers comprised in any two of the N frequency domain resource blocks is equal to: 2 to the power of i, wherein i is an integer; or
spacings of adjacent subcarriers in the N frequency domain resource blocks are equal; or
a ratio of spacings of adjacent subcarriers in any two of the N frequency domain resource blocks is equal to: 2 to the power of i, wherein i is an integer; or the to-be-transmitted data comprises at least one of constellation point modulation data and reference signal data.

3. The method according to claim 1, wherein a number of operating points of the inverse Fourier transform is greater than or equal to a number of subcarriers comprised in the corresponding frequency domain resource block.

4. The method according to claim 3, wherein:
the inverse Fourier transform comprises an oversampled inverse Fourier transform, and a part of the at least one subcarriers in the each frequency domain resource block is used for transmitting data; or
the inverse Fourier transform comprises an oversampled inverse Fourier transform, wherein subcarriers located in a central area among the at least one subcarriers in the each frequency domain resource block are used to transmit data, and subcarriers located in an edge area among the at least one subcarriers in the each frequency domain resource block transmit no data.

5. The method according to claim 1, wherein:
in response to determining that numbers of subcarriers comprised in the N frequency domain resource blocks respectively are different, time domain lengths of the N data sequences are different; or
in response to determining that a ratio of numbers of subcarriers comprised in any two of the N frequency domain resource blocks is equal to 2 to the power of i, a ratio of time domain lengths of two data sequences generated by an inverse Fourier transform processing is also equal to 2 to the power of i, wherein i is an integer.

6. The method according to claim 1, wherein
the performing the inverse Fourier transform on the N data sequences to form a data sequence comprises:
performing the inverse Fourier transform on the N data sequences to form a time domain data sequence, wherein a number of operating points of the inverse Fourier transform is greater than or equal to a value of N; or
the performing the inverse Fourier transform on the N data sequences comprises: adding M zero data sequences, wherein M is an integer.

7. The method according to claim 6, wherein the inverse Fourier transform is an oversampled inverse Fourier transform; or
the time domain data sequence is generated by serially connecting multiple data sequences generated by performing multiple inverse Fourier transforms on the N data sequences.

8. The method according to claim 6, before the performing the inverse Fourier transform on the N data sequences, the method further comprises:
adding a cyclic prefix (CP) to the N data sequences respectively; or
adding a guard interval (GI) to the N data sequences respectively, wherein the guard interval is null data.

9. The method according to claim 1, wherein upon transmitting the data sequence, the method comprises:
filtering the data sequence, wherein the filtering comprises at least one of a single-phase filtering and a poly-phase filtering; or
performing a windowing operation on the data sequence.

10. The method according to claim 9, wherein a filtering function used by the filtering comprises at least one of:
a root raised cosine function, a raised cosine function, a rectangular function, and an isotropic orthogonal transformation algorithm function.

11. The method according to claim 1, wherein the method further comprising at least one of:
- performing a Fourier transform on the to-be-transmitted data on the each frequency domain resource block;
- adding a cyclic prefix (CP) to the to-be-transmitted data on the each frequency domain resource block;
- adding a guard interval (GI) to the to-be-transmitted data on the each frequency domain resource block;
- adding a reference signal (RS) to the to-be-transmitted data on the each frequency domain resource block.

12. A non-transitory computer-readable storage medium having stored a computer program thereon, wherein the computer program, upon being executed by a processor, implements the method according to claim 1.

13. A data modulation method, comprising:
- dividing to-be-transmitted data into N data sets, wherein each data set of the N data sets comprises at least one piece of data, and N is an integer greater than or equal to 1;
- performing an inverse Fourier transform on the each data set, to form N data sequences;
- performing an inverse Fourier transform on the N data sequences, to form a data sequence; and
- transmitting the data sequence on a time-frequency resource.

14. The method according to claim 13, wherein:
- a number of pieces of data comprised in each data set in the N data sets is the same; or
- a ratio of numbers of pieces of data comprised in any two the N data sets are equal to: 2 to the power of i, wherein i is an integer; or
- the each data set comprises at least one subset, and a number of pieces of data comprised in each subset is the same within the same data set; or
- a number of operation points of the inverse Fourier transform performed on the N data sequences is greater than or equal to a value of N; or
- the data sequence is generated by serially connecting multiple data sequences generated by performing multiple inverse Fourier transforms on the N data sequences.

15. The method according to claim 13, wherein a number of operating points of the inverse Fourier transform performed on the N data sets is greater than or equal to a number of pieces of data comprised in a subset of the corresponding data set; or
in the case where the each data set comprises at least one subset, and a number of pieces of data comprised in each subset is the same within the same data set: a number of operating points of the inverse Fourier transform performed on the N data sets is greater than or equal to a number of pieces of data comprised in a subset of the corresponding data set.

16. The method according to claim 13, before performing the inverse Fourier transform on the N data sequences, the method further comprises:
- adding a cyclic prefix (CP) to the N data sequences respectively; or
- adding a guard interval (GI) to the N data sequences respectively, wherein the guard interval is null data.

17. The method according to claim 13, wherein the transmitting the data sequence on the time-frequency resource comprises:
- filtering the data sequence, wherein the filtering comprises at least one of a single-phase filtering and a poly-phase filtering.

18. The method according to claim 17, wherein a filtering function used by the filtering comprises at least one of:
- a root raised cosine function, a raised cosine function, a rectangular function, and an isotropic orthogonal transformation algorithm function.

19. An electronic device, comprising:
- one or more processors; and
- a memory, configured to store one or more programs;
- wherein the one or more programs, upon being executed by the one or more processors, cause the one or more processors to implement the following operations of:
  - transmitting to-be-transmitted data in N frequency domain resource blocks, wherein the N frequency domain resource blocks comprise at least one sub-carrier respectively, and N is an integer greater than or equal to 1;
  - performing an inverse Fourier transform on to-be-transmitted data on each frequency domain resource block of the N frequency domain resource blocks, to form N data sequences;
  - performing an inverse Fourier transform on the N data sequences to form a data sequence; and
  - transmitting the data sequence.

* * * * *